United States Patent [19]

Cardillo

[11] 4,031,397

[45] June 21, 1977

[54] METHOD AND APPARATUS FOR SEPARATING ISOTOPES

[75] Inventor: Mark J. Cardillo, Somerset, N.J.

[73] Assignee: Massachusetts Institute of Technology, Cambridge, Mass.

[22] Filed: Aug. 25, 1975

[21] Appl. No.: 607,393

[52] U.S. Cl. .............................. 250/423 P; 250/281; 250/282

[51] Int. Cl.$^2$ ........................................ H01J 39/34

[58] Field of Search .............. 250/423 P, 481, 482, 250/488, 251

[56] References Cited

FOREIGN PATENTS OR APPLICATIONS 1,284,620  8/1972  United Kingdom ............ 250/423 P

OTHER PUBLICATIONS

"Differential Cross Sections for the Scattering of CCly by Isooctane", Cardillo et al., Journal of Chem. Phy., vol. 54, No. 7, Apr. 1971, pp. 3054–3065.

Primary Examiner—Alfred E. Smith
Assistant Examiner—B. C. Anderson
Attorney, Agent, or Firm—Arthur A. Smith, Jr.; Robert Shaw; Paul J. Cook

[57] ABSTRACT

A process and apparatus for separating isotopes from gaseous mixtures by forming a seeded molecular beam comprising a carrier gas and the isotopes, exposing the seeded beam to a laser light having a particular radiation frequency to accentuate differences in the velocity profiles of the isotopes in the beam and separating the isotopes based upon the differences in their velocity profiles. The frequency of the laser is such as to excite only one of the isotopes, e.g. the lighter one, so that it possesses a larger amount of rotational energy without exciting the other isotope(s).

8 Claims, 4 Drawing Figures

METHOD AND APPARATUS FOR SEPARATING ISOTOPES

This invention relates to a method and apparatus for separating isotopes from mixtures thereof and more particularly to a method and apparatus for utilizing selective, laser-induced, molecular excitation followed by physical separation.

There are about 60 elements having more than one stable isotope occurring naturally. At the present time, the available methods for isolating particular isotopes are extremely expensive which has greatly limited their commercial application. Various isotopes are extremely useful as tracers in a wide variety of applications. For example, some elements have both radioactive and non-radioactive isotopes which can be used respectively as tracer elements for studying various body functions, as well as comprising a useful diagnostic tool in medicine. Thus, oxygen-18 has found extensive use as a non-radioactive tracer in metabolism studies. Similarly, radioactive iodine has been extremely useful as a radioactive tracer in the diagnosis of human thyroid conditions. A particularly important application for separating isotopes is the separation or enrichment of uranium-238 from mixtures containing relatively rare uranium-238 and relatively abundant uranium-235.

A wide variety of methods have been proposed for separating isotopes from mixtures thereof which involve the selective excitation of one of the iostopes with photons emitted from a laser. These procedures require an absorption spectrum having a well-resolved isotopic shift, a laser source which excites one isotope by absorption and not the other isotopes, subsequent physical or chemical separation of the excited isotopes from the unexcited isotope or molecules containing such isotopes and conditions which prevent energy transfer from the excited isotopes prior to such physical or chemical separation. A number of physical or chemical separation steps have been proposed including photopredissociation, photodissociation or photochemical separation which involved the selective excitation of either the chemical bonds, i.e. electronic excitation, in molecules containing such isotopes or of the nuclear motion of the isotopes such as in vibrational excitation of the nucleii. In addition, it has been proposed to separate the isotopes based upon the momentum transferred from the photon that collides with the excited isotope, such as in a molecular beam that can be deflected into a collector. However, the present state of the art has not resulted in the requisite degree of isotope separation sufficient to provide a commercial incentive for its utilization.

It also has been proposed to separate isotopes in a manner which utilizes the slippage effect observed in seeded molecular beams. A relatively light gas is expanded through a nozzle to a velocity in the order of about 10 times the speed of sound wherein the gas molecules have a relatively narrow velocity profile wherein the velocity spread of the gas molecules is only in the order of about 10% of the most probable velocity. A seeded molecular beam is formed by introducing a heavier gas species into the light gas prior to forming the molecular beam. It has been observed that in seeded molecular beams formed of a dilute mixture of a heavy gas in a light gas that the acceleration of the heavy species by the light gas is incomplete and that the heavy species does not reach the velocity of the light gas. The amount of slippage in the molecular beam depends upon the mass and concentration of the heavy species. Furthermore, it has been suggested that when the heavy species comprises an isotopic mixture of the same compound that a difference in slippage will be observed between the various heavy isotopes such that there is a segregation of the velocity distribution of the isotopes. It has been predicted that the velocity distributions of the respective isotopes of the heavy species approaches that of a one-dimensional Maxwellian distribution. The velocity distributions of the respective isotopes become shifted from each other during the residence times within the expansion region prior to formation of the molecular beam with the lighter isotopes of the heavier species more nearly approaching the velocity of the light species of the molecular beam as compared to the velocity distribution of the heavier isotopes. That is, the lighter isotopes of the heavy species attain a higher velocity within the beam than do the heavier isotopes of the heavy species in an amount which is proportional to the difference between their respective masses. By the time this shift is effected, the gas mixture is sufficiently rarified due to expansion that there are no longer collisions between the species. This expanding gas from this point on is called a molecular beam as it conforms to the laws of free molecular flow and the velocity distributions of the respective species remain constant. The molecular beam is then directed into an apparatus which separates the isotopes of the heavy species from each other on the basis of their difference in velocity distributions. Once the expanding gas becomes a molecular beam, synonomous in this case with a collisionless beam, its properties are fixed (frozen). All the action or separation takes place in the expansion up until the density drops below a certain value at which point the mean free path becomes so large that the gas becomes collisionless.

Throughout the expansion, prior to becoming a free flowing molecular beam, it is estimated that the mole fraction of the heavy species must be maintained quite low in order to obtain the desired differences of the velocity profiles of the isotopes. For example, with uranium hexafluoride as the heavy species and helium as the light species, it has been estimated that the mole fraction of the uranium hexafluoride should be maintained at 5% or less. This is because at higher concentrations for the heavy species, the collisions between the various isotopes will be greatly increased so that their respective velocities will approach that of the other isotopes thereby resulting in greater overlapping of the respective velocity distributions of the uranium-238 and the uranium-235 species. This, of course, will greatly minimize or prevent subsequent separation of the isotopes of the heavy species based upon the difference in velocity distribution within the molecular beam. This latter proposed method has been estimated to provide a separative work factor about 500 times greater than with a gas diffusion process and about 100 times greater than the curved jet method for separating uranium-235 from uranium-238. However, the difference in the velocity profile of the uranium-235 and uranium-238 is quite minimal so that is is still quite difficult to attain significant enhanced enrichment of one species. While this method may provide a means for improved separation of the hexafluorides of uranium-235 and uranium-238 as compared to the present commercially employed processes, there is a strong centive for providing a means for further improving the separation of isotopes. Particularly, it would be desirable to provide a means for significantly enhancing velocity separation of the isotope of the heavier species in order to significantly improve enrichment of the desired isotope.

SUMMARY OF THE INVENTION

The present invention is based upon the discovery that by selective laser excitation of the rotational and vibrational kinetic energy of the nuclei of one isotope without exciting either the rotational or the vibrational kinetic energy of the other isotopes and by forming a seeded molecular beam which contains the selectively excited mixture of isotopes, greatly improved separation of the isotopes within the molecular beam can be attained. The seeded molecular beam so-formed then is directed into a means for separating the isotopes of the heavier species based upon a difference in velocity distribution of the isotopes. Separation is effected after the selectively excited isotope has converted at least a portion of its rotational kinetic energy into translational kinetic energy by collisions with other molecules but prior to the time that a sufficient number of collisions between the isotopes has occurred such that there is little or no difference between their velocity distributions. Selective laser excitation is effected between the time the expansion begins and the time it becomes a collision free molecular beam and is passed into the separation means.

DESCRIPTION OF SPECIFIC EMBODIMENTS

A mixture of a light carrier gas and a heavier seed gas; the latter comprising at least two isotopes is directed through an expansion nozzle from a plenum chamber under high pressure to form a seeded molecular beam. The expansion nozzle can comprise a simple hole through the wall of the plenum chamber of can comprise a venturi nozzle or any conventional nozzle. The pressure and configuration of the nozzle is regulated so that the gas accelerating through the nozzle attains free jet expansion to form the seeded molecular beam wherein the light gas molecules move uniformly in that there is little relative movement of the light gas molecules within the molecular beam. Generally, the relative movement of the light gas molecules in the molecular beam is in the order of less than about 10% of their mean velocity. Suitable pressures for obtaining the molecular beam are between about 5 and about 100 p.s.i. preferably 5–50 p.s.i. When employing a simple hole in the wall of the plenum chamber, all that is necessary to obtain an ideal free jet is that the diameter of the hole be larger than the thickness of the wall. Generally, the hole diameter is between about 10 and about 0.1 millimeter, preferably from 10 to 0.1 millimeter. The means for obtaining the molecular beam is not critical to the present invention. Any conventional means for obtaining the molecular beam can be employed such as is disclosed in Becker & Bier, Z Naturforch, 9A, 975(1954) or Anderson & Fenn, Phys. Fluids, 8, 780(1965). Due to its lower mass, the lighter gas moves initially at a higher velocity than the heavier gas. But due to collisions between the light gas and heavy gas molecules, the heavy gas experiences an increased velocity while the lighter gas experience a decrease of velocity so that the two have a velocity more nearly equal to each other within a relatively short time, wherein the molecules experience an average number of collisions of between about 100 and about 1000.

Without laser excitation, velocity slippage occurs in a manner such that the velocity distribution of the isotopes of the heavy species become non-coincident. In the process of this invention, this non-coincident velocity slippage is greatly magnified by exposing the gas mixture exiting from the nozzle tip to a laser emiting photons at a frequency to selectively excite the rotational kinetic energy of the lighter isotope. This exposure is effected so that the energy supplied to one of the isotopic species is not dissipated either to the other of the isotopic species or to the light gas prior to forming the molecular beam.

It is essential that the frequency of the laser is chosen so that it increases the rotational internal kinetic energy of the lighter of the isotopic heavy species. By controlling the laser frequency in this manner, the lighter isotopic species can be energized so that a portion of its laser-induced energy is converted into translational energy to further increase its velocity in the molecular beam relative to the velocity of the other isotopic heavy species. In contrast, when employing a laser source which energizes only the vibrational energy as opposed to rotational energy, further differences in the velocity profiles of the isotopic species is not attained between the time the molecular beam is formed and the time it is separated into its component parts. This phenomenon can best be understood by way of example wherein a molecular beam is formed from helium as the light species and carbon dioxide formed from carbon-12 and carbon-13 as the heavier isotopic species. In such a system, the number of collisions between molecules to effect relatively uniform energy within the molecules depends upon whether one is referring to the vibrational energy, the translational energy or the rotational energy of the molecule. In the helium-carbon dioxide system referred to, the number of collisions needed to average the translational kinetic energy of the carbon dioxide isotopic species is only one or two; the number of collisions to average their rotational energy is about 6 and the number of collisions needed to average their vibrational energy is about 10,000. Thus, if the carbon dioxide formed of carbon-12 were simply heated causing the excitation of primarily translational energy, the probability would be very high that between the start of the expansion and the time of forming and collecting the molecular beam, one such collision would occur thereby giving each isotopic species essentially the same velocity profile. On the other hand, if as the expansion begins the carbon dioxide formed from carbon-12 was exposed to a laser source which excited the vibrational energy solely, the probability would be very high that there would be little, if any conversion of the vibrational energy to translational energy by virtue of collisions with other molecules due to the extremely high number of such collisions needed to convert the vibrational energy to translational energy. In contrast, when the carbon dioxide formed from carbon-12 is subjected to a laser which energizes the rotational energy thereof, either alone or in conjunction with energizing vibrational energy, at some point midway during the expansion, the probability is quite high that, within the period between the time of molecular beam formation and collection, only a portion of the rotational energy would be converted to translational energy by virtue of collisions with adjacent helium molecules but substantially without such collisions with the other isotopic species. Since this conversion to translational energy occurs, the velocity of the lighter isotopic species is further increased relative to the heavier isotopic species by providing a further difference between the velocity profiles between the isotopic species.

The laser to be used in the process of this invention obviously depends upon the chemical nature of the isotopic species desired to be separated. As it is well known, molecules have their own characteristic vibrational and rotational frequencies which can be determined by a number of alternative known methods such as ultraviolet, infrared, or microwave spectroscopy. These vibrational and rotational frequencies also are different for different isotopic species of the same compound. Accordingly, all that is necessary is that one provide a laser having a radiation frequency coinciding with the rotational or vibrational plus rotational frequency of the isotope it is desired to excite. As a practical matter, it is difficult to provide a laser source which emits photons at a frequency coinciding only with the rotational frequency of the molecules so that lasers are employed which emit radiation at a frequency that coincides with the vibrational as well as the rotational frequency of the molecule. Suitable lasers are those that lase in the infrared spectrum such as hydrogen fluoride, nitrous oxide, carbon dioxide or carbon monoxide. For example, when it is desired to separate carbon-13 from carbon-12 as $CO_2$, a carbon dioxide tuneable laser having a radiation frequency of between 9.2 and 10.6 microns can be employed. When it is desired to separate $U^{235}F_6$ from $U^{238}F_6$, a suitable laser in the 12 to 14 micron range. Carbon dioxide lasers also can separate isotopes of carbon, oxygen, nitrogen, boron, sulfur and silicon in the form of carbon dioxide, ammonia, boron trichloride, sulfur hexafluoride and silicon hydride.

After the seeded molecular beam is formed and selectively excited, it is passed through an apparatus which separates the isotopes on the basis of their difference in velocity profiles. The time expended between initial molecular beam formation and isotope separation is usually between about $10^{-3}$ and about $10^{-5}$ seconds. Representative suitable separation apparatus include velocity selectors which are described, for example, in *The Journal of Chemical Physics*, Volume 54, Number 7, Apr. 1, 1971, pages 3054 to 3064 which is incorporated herein by reference. The gas streams separated on the basis of their difference in velocity profiles then are segregated and can be utilized in this form or can be recycled through the process to provide further isotope enrichment.

Reference is made to the figures.

Figure 1:
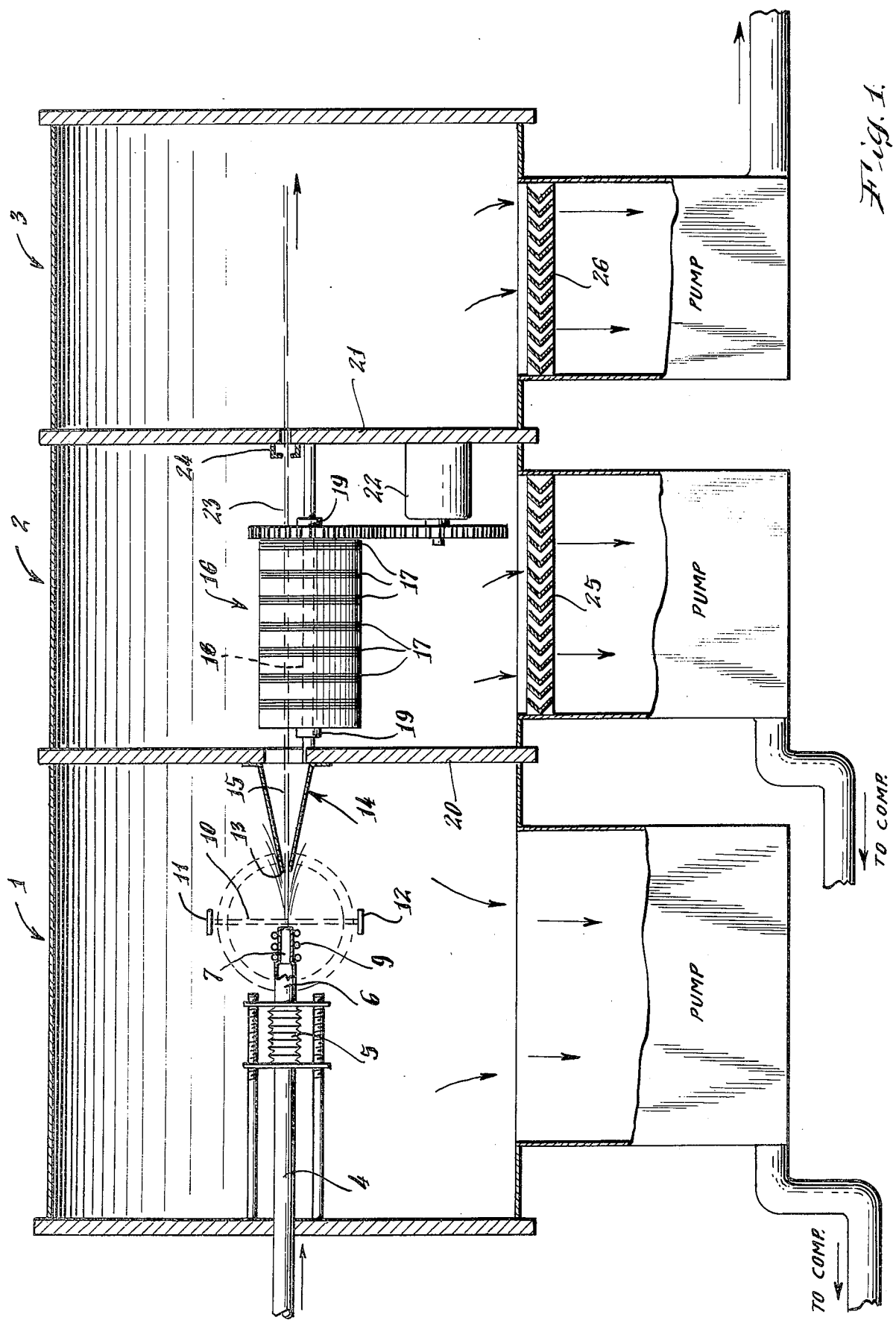
FIG. 1 is a cross-sectional view of the apparatus of this invention.
Figure 2:
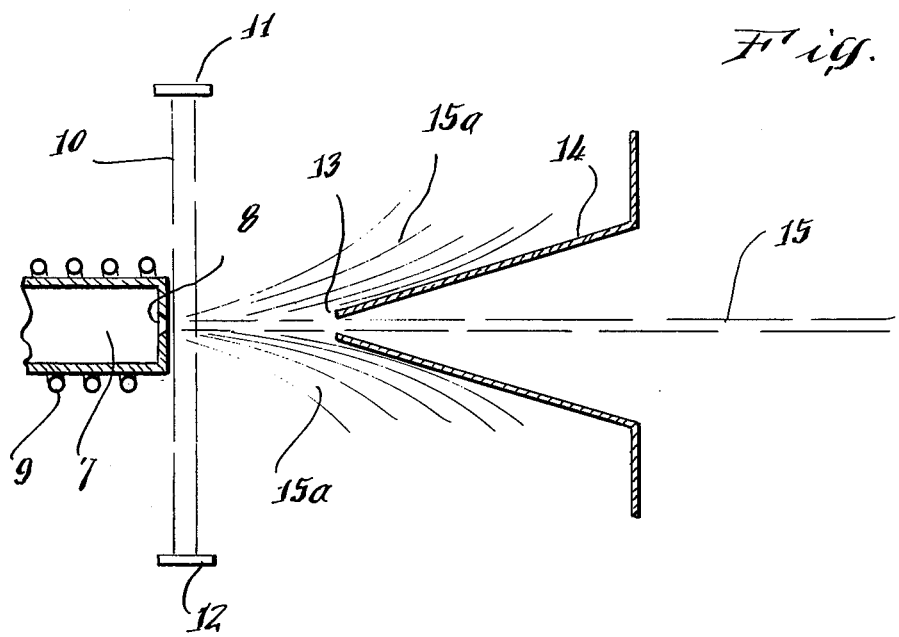
FIG. 2 is a detailed view of the means for forming the selectively-seeded molecular beam.

Referring to FIG. 1, the apparatus is divided into three sections. In the initial section, 1, the seeded molecular beam is formed and selectively excited such that the velocities of the different species separate. In the middle section, 2, the molecular beam is separated according to velocity to provide desired isotope enrichment. In final section, 3, the enriched molecular beam is recovered. A mixture of light and heavy gases wherein the heavy gas comprises a mixture of isotopes either in the form of elements or in the form of the same chemical compound is directed from a compressor (not shown) through conduit 4 into initial section 1. The gas mixture passes from conduit 4 through a bellows arrangement which allows the nozzle skimmer distance to be varied into plenum chamber 6. The total pressure inside the plenum chamber 6 is between about 5 and 500 p.s.i.a. The gas mixture then is passed from plenum chamber 6 into nozzle 7 and through orifice 8. The nozzle 7 is provided with a heating element 9 in order to heat the gas in nozzle 7 if desired. The gas mixture exits through the nozzle in the form of a seeded molecular beam having a velocity in the order of about ten times the speed of sound. The nozzle orifice size generally is between about 0.001 to about 0.1 inch according to the pressure usually about 0.001 inch.

The seeded molecular beam is passed through a reinforced laser light 10 which is reflected between mirrors 11 and 12. The frequency of the laser light is selected so that it excites the vibration and rotational kinetic energy of the lighter isotope of the heavy gas for the reasons set forth above. After the molecular beam has been exposed to the laser light, it is passed through the orifice 13 of skimmer 14 to separate the molecular beam 15 from the gas mixture 15a which has not attained the translational kinetic energy characteristics of the molecular beam 15. The molecular beam then is passed into velocity selector 16 which comprises a series of etched disks 17 mounted on a rotatable shaft 18. The disks 17 are etched to form slots around their entire periphery. The slots in their respective disks 17 are arranged to form a channel at a fixed angle to the rotatable shaft 18. This angle and the speed of rotation of the velocity selector are controlled to allow the lighter isotope having the higher velocity to pass through the selector. The heavier isotope of the heavy gas, at the selected angle and speed of rotation, strikes the solid portion, of the disks and is trapped within zone 2. Details of the construction of a suitable velocity selector are shown in *The Journal of Chemical Physics*, Volume 54, Number 7, Apr. 1, 1971, pages 3054 to 3064 which is incorporated herein by reference. The rotatable shaft 18 is mounted on bearings 19 which in turn are mounted respectively on walls 20 and 21. The velocity selector is driven by a motor 22 which also is mounted on wall 21. The enriched molecular beam which exits from the velocity selector then is passed through collimator 24 mounted on wall 21 and thence into final section 3 for collection.

The gas excluded by orifice 13 and collected in initial section 1 is removed therefrom for passage to a compressor (not shown) by a high capacity pump having a pumping speed in the order of about 10,000 liters/second for the small orifice-high pressure expansions such as Roots Blower pump or its equivalent. The capacity of the pump is dependent upon the mass flow rate of the gas passing through orifice 8. The gas trapped by the velocity selector 16 in middle section 2 is removed therefrom through baffles 25 by being pumped, with for example, a diffusion pump for recycling to the compressor (not shown). The gas enriched with the lighter isotopic species in final section 3 is removed therefrom through baffles 26 by means of a diffusion pump and is passed to a zone (not shown) for collection.

Figure 3:
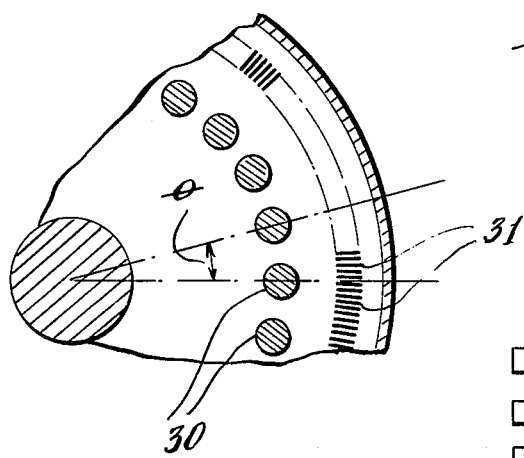
FIG. 3 is a detailed front view in the direction of molecular beam translation of a velocity selector disk.
Figure 4:
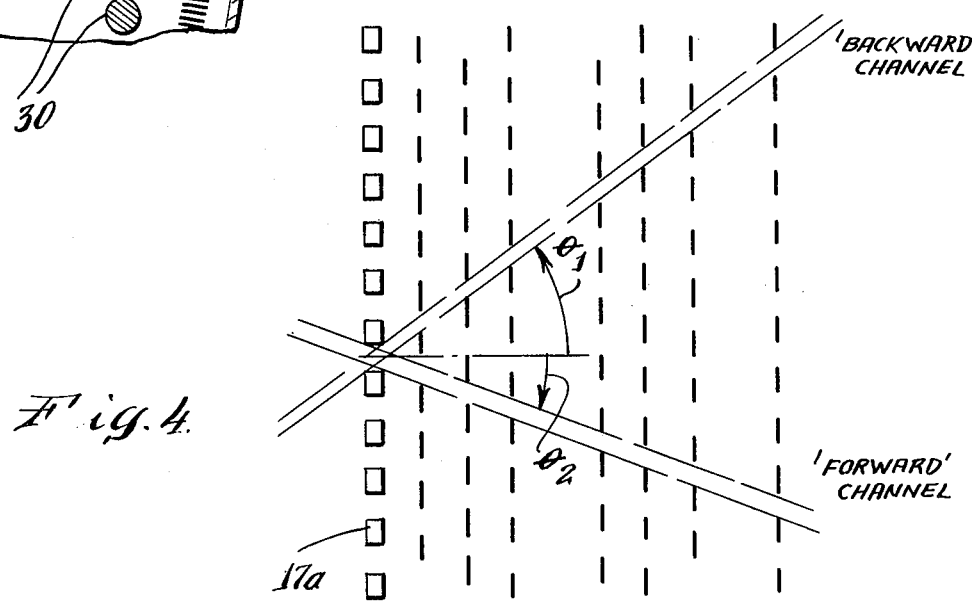
FIG. 4 is a schematic side view of a disk arrangement of the velocity selector.

Referring to FIGS. 3 and 4, each disk 17 is provided with a central hole to accommodate the axle 18 and a plurality of holes to accommodate a plurality of tie rods 30 which function to permit positioning the disks. Each disk also is provided with a number of slots 31 which extend around its periphery and can be formed therein by etching. The initial disk 17a is relatively thick and can be formed of a plurality of stacked disks, typically about 10 disks. The initial disk serves to block molecules with speeds which are submultiples of those passed by the open channels. The angle $\theta$ is defined as the angle formed from the center of two adjacent tie rods and the center of the axles. The centers of the tie rods lie on radii with relative rotations that are chosen for a given isotope and carrier gas system. In any event, these radii are chosen to provide two channels identified as a "forward" channel and a "backward" channel. Either the backward or the forward channel is open during use of the disk which will depend upon the direction of rotation of the velocity selector. The backward channel, as shown, has the larger pitch and is employed to permit passage of high velocity molecules at a lower velocity selector rotational speed as compared to the rotational speed needed to utilize the low pitch forward channel.

The apparatus shown in the figure can be employed, for example, to separate $C^{12}O_2$ from $C^{13}O_2$ or $U^{235}F_6$ from $U^{238}F_6$ when diluted in an inert carrier gas having a different mass, such as helium to a specified mole fraction, for example 20%. Typical operating parameters include a pressure of 60 p.s.i.a. inside the nozzle 7, a nozzle orifice 8, of about 0.001 inch, a nozzle temperature varying about room temperature to about 3,000° F, a distance between the nozzle orifice 8 and the skimmer orifice 13 of about 100 and 1,000 nozzle orifice diameters. A skimmer orifice size of about 10 times nozzle orifice size of about 0.010 inch and the location of the nozzle-laser beam crossing being at any point between the outside nozzle tip 8 and outside skimmer tip 13, preferably being located at the outside nozzle tip 8. The pressure in initial section 1 is maintained relatively low, in about $10^{-4}$ torr or below in order to avoid shock waves. The initial section 1 typically would be about 12 inches in length in order to provide a ballast effect to interface with a high capacity pump. The middle section 2 should be as short as possible to minimize the loss of molecular beam intensity that is to be collected. A typical length for section would be about 6 inches. The pressure in section 2 can be maintained with a diffusion pump having a capacity typically of about 5,000 liters per second so that the pressure therein will be about $10^{-6}$ torr. The gas entering the final section 3 through a collimator the size of the beam can be passed by means of a diffusion pump to separate the lighter gas from the heavier gas, typically to a gas chromatographic column.

What is claimed is:

1. A process for separating isotopes from a gaseous mixture thereof which comprises expanding said mixture to form a molecular beam of the mixture in a carrier gas, the molecules of the carrier gas having a mass either less than or greater than the mass of all the molecules containing the isotopes, exposing the gaseous mixture to a laser light having a radiation frequency that causes excitation of the rotational energy of the isotope molecules having the lowest mass without exciting the rotational energy of the other isotope molecules in said mixture, passing said molecular beam through a means for separating the mixture of isotopes on the basis of differences in velocity profiles of each of the isotopes, controlling the time period between the initial expansion of the gas and subsequent separation of the molecular beam to permit conversion of at least a portion of laser-induced rotational energy to translational energy by secondary collision of the excited isotope molecules with molecules of said carrier gas but without substantially complete conversion of said induced rotational energy to translational energy.

2. The process of claim 1 which includes the further step of providing the means for segregating the molecular beam from the remaining portion of the emitted gas prior to contacting the molecular beam with the means for separating the isotopes based upon the difference in velocity profiles of said isotopes.

3. The process of claim 1 wherein the isotopes comprise a gaseous mixture of compounds of uranium-238 and uranium-235.

4. The process of claim 2 wherein the isotopes comprise a gaseous mixture of compounds of uranium-238 and uranium-235.

5. Apparatus for separating isotopes from a gaseous mixture thereof comprising means for expanding the mixture to form a molecular beam of said isotopes in a carrier gas, means for exposing said beam to a laser light having a radiation frequency that causes excitation of the rotational energy of the isotope molecule having the lowest mass without exciting the rotational energy of the other isotope molecules in said mixture and means for separating the mixture of isotopes on the basis of differences in velocity profiles of each of the isotopes, locating said means for separating the mixture a distance from the means for forming the molecular beam thereby to control the time period between expansion and separation to permit at least a portion of the laser-induced rotational energy to be converted to translational energy by secondary collision of the excited isotope molecules with molecules of said carrier gas but without substantially complete conversion of said induced rotational energy to translational energy.

6. The apparatus of claim 5 which includes a means for separating the molecular beam from at least a portion of the gaseous mixture not forming the molecular beam and being positioned between the means for forming the molecular beam and the means for separating the isotopes on the basis of differences in the velocity profile of the isotope.

7. The apparatus of claim 5 wherein the means for separating the isotopes comprises a velocity selector.

8. The apparatus of claim 6 wherein the means for separating the isotopes comprises a velocity selector.

* * * * *